United States Patent
Kraft et al.

(10) Patent No.: US 6,487,424 B1
(45) Date of Patent: Nov. 26, 2002

(54) DATA ENTRY BY STRING OF POSSIBLE CANDIDATE INFORMATION IN A COMMUNICATION TERMINAL

(75) Inventors: Christian Kraft, Copenhagen; Jacob Hansen, Vordingborg, both of (DK); Päivi Pukkila, Oulunsalo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/229,788

(22) Filed: Jan. 13, 1999

(30) Foreign Application Priority Data

Jan. 14, 1998 (GB) .............................................. 9800746

(51) Int. Cl.$^7$ .............................. H04B 1/38; G09G 5/00; G09G 5/08
(52) U.S. Cl. ........................ 455/566; 455/550; 345/812; 345/813; 345/816; 345/167; 345/157
(58) Field of Search ................................ 455/566, 575, 455/550; 345/167, 163, 157, 145, 146, 810, 811, 812, 813, 816

(56) References Cited

U.S. PATENT DOCUMENTS

| | | | |
|---|---|---|---|
| 5,692,032 A | | 11/1997 | Seppänen et al. ............ 455/466 |
| 5,724,457 A | * | 3/1998 | Fukushima ................. 382/311 |
| 5,734,749 A | * | 3/1998 | Yamada et al. ............. 382/187 |
| 5,794,142 A | | 8/1998 | Vantila et al. .............. 455/419 |
| 5,797,098 A | * | 8/1998 | Schroeder et al. .......... 455/464 |
| 5,845,205 A | | 12/1998 | Alanara et al. ............. 455/564 |
| 5,905,964 A | * | 5/1999 | Sudo ......................... 455/566 |
| 5,915,228 A | * | 6/1999 | Kunihiro et al. ............ 455/575 |
| 5,991,396 A | * | 11/1999 | Salm et al. ................. 379/355 |
| 6,021,336 A | * | 2/2000 | Kunihiro et al. ............ 455/575 |
| 6,097,964 A | * | 8/2000 | Nuovo et al. ............... 455/566 |
| 6,104,381 A | * | 8/2000 | Watanabe et al. ........... 345/160 |
| 6,178,338 B1 | * | 1/2001 | Yamagishi et al. .......... 455/566 |
| 6,198,939 B1 | * | 3/2001 | Holmström et al. ......... 455/566 |
| 6,198,948 B1 | * | 3/2001 | Sudo et al. ................. 455/566 |

FOREIGN PATENT DOCUMENTS

| | | |
|---|---|---|
| EP | 0 624 965 | 11/1994 |
| EP | 0 755 142 | 1/1997 |
| GB | 2 118 751 | 11/1983 |
| GB | 2 163 578 | 2/1986 |
| GB | 2 165 071 | 4/1986 |
| GB | 2 259 386 | 3/1993 |
| GB | 2 319 691 | 5/1998 |

OTHER PUBLICATIONS

"Theoretical upper and lower bounds on typing speed using a stylus and soft keyboard"; Soukoreff et al.; Behaviour & Information Technology, (1995) 14(6), pp. 370–379.

* cited by examiner

Primary Examiner—William Trost
Assistant Examiner—Rafael Perez-Gutierrez
(74) Attorney, Agent, or Firm—Perman & Green, LLP

(57) ABSTRACT

A communication terminal is provided with display means, navigation means for navigating through information candidates, selection means for selecting one of the candidates, and a processor controlling the display means in accordance with the operation of the navigation means and the selection means. The display means comprises a first display part for displaying a string of entered information, and a second display part for displaying a string of a plurality of possible information candidates. One of the candidates in the second display part is highlighted by the cursor controlled by the navigation means. The processor copies the highlighted candidate from the candidate string into the entered information string upon selection by the selection means.

8 Claims, 4 Drawing Sheets

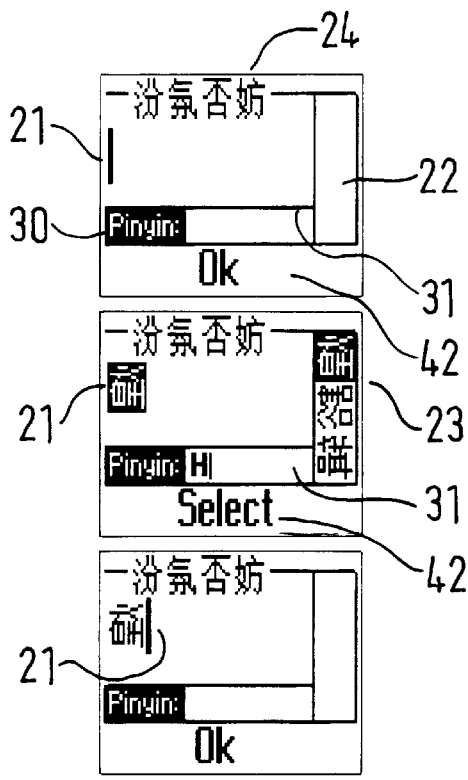
FIG. 7
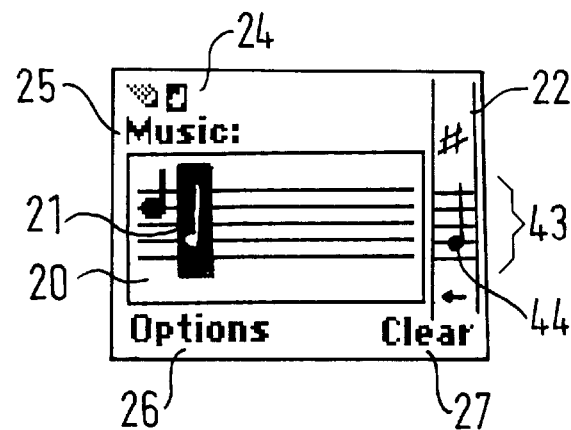
FIG. 9
FIG. 8

DATA ENTRY BY STRING OF POSSIBLE CANDIDATE INFORMATION IN A COMMUNICATION TERMINAL

BACKGROUND OF THE INVENTION

Communication terminals, such as hand portable phones or handsets, are able to handle and exchange ever increasing amounts of data. Traditionally, this type of terminals is equipped with a pocket calculator keypad with twelve alphanumeric keys including the figures 0–9 and some extra signs.

These alphanumeric keys include several figures, signs, letters, special signs and so on available by multiple pressing of the individual keys. In general, a key can include up to ten different signs or more. Therefore, inputting of text, for e.g., short messages may require many key strokes compared with the number of letters in the message.

However, integration of the entry of alphanumeric data into a thumb wheel has been described in EP 755 142 A. This thumb wheel is placed in the upper left corner of the phone. When text is entered into the display, a position pointed out by a cursor is highlighted. By rolling the thumb wheel the sign displayed in the currently highlighted field changes, and by pressing the thumb wheel the highlighted sign is selected and the cursor jumps to the next position.

SUMMARY OF THE INVENTION

In accordance with the invention there is provided a method of entering information into a communication terminal having a display, navigation means for navigating through information candidates, and selection means for selecting one of the candidates, said method comprising displaying in the display a string of entered information, displaying, separately from the entered information string, a second string of possible information candidates, one of these candidates being highlighted by the cursor controlled by the navigation means, and copying the highlighted candidate from the second string to the entered information string upon selection by the selection means. Hereby, the user will be able to overview both the written characters and the characters he may select for entering. This makes it possible to vary the string of candidates, and the information entry method may be used in relation to several different applications, such as normal text entry, calculator entry, music entry, and entry of Chinese signs.

The invention provides a new and improved method of entering data into a communication terminal, allowing the user to increase the data entry rate.

In accordance with a preferred embodiment of the invention, the method is used in a communication terminal, such as a phone having navigation means provided as a depressable roller wheel, said method including moving the cursor by rolling the roller wheel, and selecting an item pointed out by the cursor by depressing the roller wheel. Then the user may concentrate on what is going on in the display—while he is only using a single key.

In accordance with the preferred embodiment of the invention, the terminal is equipped with at least two entry modes for entering different types of information into different applications in the terminal, and comprising sorting the possible information candidates in the second string in dependence on the current mode of the terminal. When entering a text in Latin letters, there is no need for displaying Chinese letters, music notes, or other irrelevant signs.

Preferably, the terminal sorts the possible information candidates in the second string in dependence on at least one previously selected character. This sorting will preferably be language dependent. In English, e.g., when a word already contains the letters "ph", the next candidate will probably be one of the letters "a", "e", "i" or "y". Similar lists may be made for all letters and languages. If a terminal, e.g., includes 20 languages, a corresponding number of lists may be stored within 6–10 Kbytes in total. However, it will only be the list for the language selected by the SIM card or manually by the user that will be used.

When more memory space is available a full electronic dictionary can be loaded into the memory of the terminal. Then the processor will search the dictionary memory to find a word matching the letters already entered, and display the best matching word in a third display part selectable for the user. The displayed suggestion will be adapted dynamically when a letter is entered.

This concept will be very useful for languages having many different signs or characters, such as Chinese, Thai, and Arabic. Here, the dictionary could link the sign and the English pronunciation in Latin letters together. Then the processor will search the pronunciation strings to find the string that fits best with the letters already entered. The corresponding sign will be displayed in the third display part.

The invention furthermore relates to a communication terminal having display means, navigation means for navigating though information candidates, selection means for selecting one of the candidates, and a processor controlling the display means in accordance with the operation of the navigation means and the selection means. The display means comprises a first display part for displaying a string of entered information, and a second display part for displaying a second string of a plurality of possible information candidates, one of these candidates being highlighted by the cursor controlled by the navigation means. The processor copies the highlighted candidate from the second string into the entered information string upon selection by the selection means. The same information concept may thereby be used irrespective of the type of information to be entered.

When the terminal according to the preferred embodiment of the invention is used as a hand portable phone, the display may be a substantially rectangular LCD display, wherein the first display part constitutes the major part of it, and the second display part is provided as a strip along one of the edges of the display. This will give a good appearance when the display is a graphical display.

Preferably, the terminal is provided with navigation means having a roller body, such as a thumb wheel. When the roller body is rolled, the cursor will move, and when the roller body is pressed, the item pointed out by the cursor is selected. This allows for good control of the cursor—especially when the roller body is placed centrally below the display. However, the navigation means may be provided as a navigation key known per se and having a step-up/step-down functionality, and the selection means may be provided as a separate key, e.g., a soft key, for selecting the item currently pointed out by the cursor. This will improve the entry rate when the candidates are sorted in an intelligent way.

An important advantage of the inventive concept is that the same entry concept may be used for different types of entries. When the terminal is equipped with at least two entry modes for entering different types of information into different applications in the terminal, the processor sorts the possible information candidates in the entry string in dependence on the mode of the terminal.

In each mode the processor will handle a basic default string of candidates. According to a preferred embodiment, the processor will, for each information candidate entry, generate a dynamic string of candidates, comprising a group of the most probable characters in the beginning followed by the default string. Then, for longer words, the letter to be entered may be found among the first 4–8 letters—which will be about half a rotation of the roller body.

The inventive concept will be especially valuable for the handling of complex signs, such as Chinese signs. For this purpose, a third display part will be created in some applications, when necessary. The user may input Latin letters for the pronunciation, and the terminal will display the best fitting Chinese signs in response thereto for selection. This concept may also be used for normal text editing, where the processor then suggests a full word found in a dictionary stored inside the terminal in response to the entered letters of a word.

BRIEF DESCRIPTION OF THE DRAWINGS

FIG. 7 shows another sequence of displays illustrating an alternative embodiment of entering Chinese letters into a phone according to the invention.

FIG. 8 schematically illustrates an alternative embodiment of a hand portable phone according to the invention.

FIG. 9 schematically shows the display in a music entry mode of the phone according to the invention.

DETAILED DESCRIPTION OF THE INVENTION

The information entry concept is general for personal communication terminals having a limited display area and a limited set of input keys. This type of terminals comprises cellular phones, cordless phones, pagers, smart phones, and communicators. The customers ask for smaller and smaller terminals, which results in display sizes of less than fifty signs—in extreme situations less than twenty signs. The invention will be described in the following with reference to a preferred embodiment according to which the concept is implemented in a cellular phone.

Figure 1:
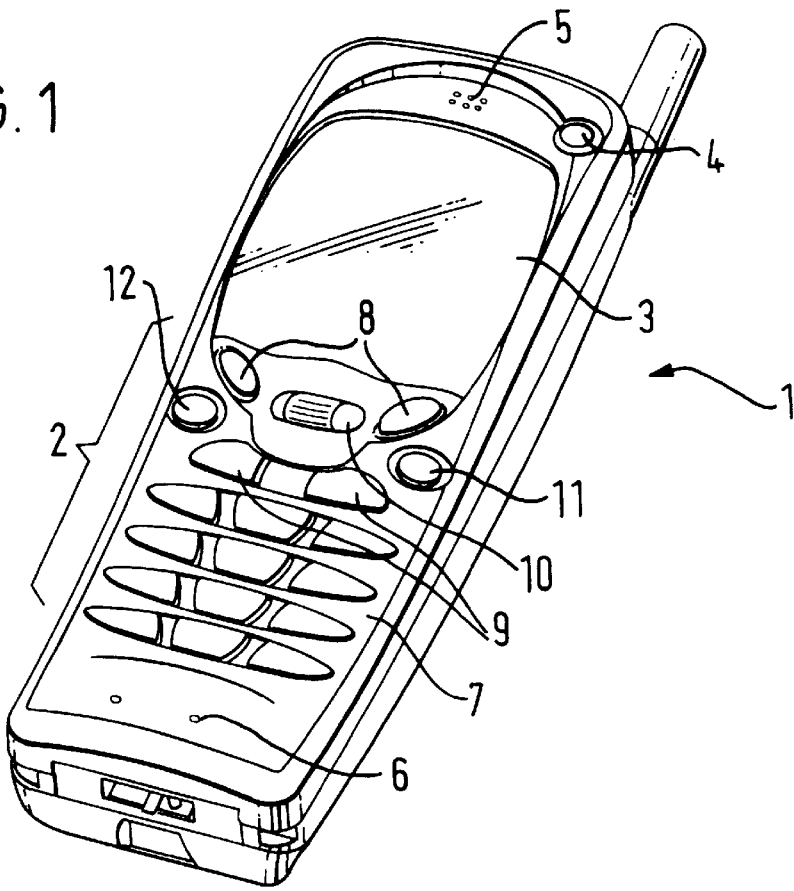
FIG. 1 schematically illustrates a preferred embodiment of a hand portable phone according to the invention.

FIG. 1 shows a preferred embodiment of a phone according to the invention, and it will be seen that the phone, which is generally designated by 1, comprises a user interface having a keypad 2, a display 3, an on/off button 4, an earpiece 5, and a microphone 6. The phone 1 according to the preferred embodiment is adapted for communication via a cellular network, but could have been designed for a cordless network as well. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0–9" or a sign "#" and "*", respectively. In alpha mode each key is associated with a number of letters and special signs used in the text editing.

The keypad 2 additionally comprises two soft keys 8, two call handling keys 9, a navigation key 10, a key 11 switching between alpha mode and numeric mode, and a clear key 12.

The two soft keys 8 have a functionality corresponding to what is known from the phones Nokia 2110™, Nokia 8110™, and Nokia 3810™. The functionality of the soft key depends on the state of the phone and the navigation in the menu by using a navigation key. The present functionality of the soft keys 8 is shown in separate fields in the display 3 just above the keys 8.

The two call handling keys 9 according to the preferred embodiment are used for establishing a call or a conference call, terminating a call or rejecting an incoming call. The clear key 12 may be used, e.g., for erasing the digit or letter entered last by brief depression, while depression of a longer duration will erase the entire number or word. The key 11 switches between alpha mode and numeric mode in a text editing mode.

The navigation key 10 is placed centrally on the front surface of the phone between the display 3 and the group of alphanumeric keys 7. Hereby the user will be able to control this key with his thumb. This is the best site to place an input key requiring precise motor movements. Many experienced phone users are used to one-hand handling. They place the phone in the hand between the finger tips and the palm of the hand. Hereby the thumb is free for inputting information.

The navigation key 10 includes a roller body as described in the applicant's co-pending U.S. application, U. S. Ser. No. 08/923,696, filed on Sep. 4, 1997. This application is hereby incorporated by reference. The roller body extends partly through an opening in the front cover of the phone, and said roller body is essentially cylindrical with a length and diameter of the same size as the width of the keys in the alphanumeric group of keys 7. When the axis of rotation of the roller body is provided such that it extends perpendicularly to the longitudinal axis of the phone 1, the rolling of the roller body will move a cursor in the display in an up/down direction corresponding to the movement of the thumb. The navigation key structure is furthermore provided with a microswitch for detecting the depression of the roller body, thereby providing a selection signal for the controller 18 (FIG. 2) indicating that the item pointed out in the display has been selected.

When the navigation key 10 is arranged as an extension of the central column of the alphanumeric keys 7, the navigation key can be accessed optimally by both left- and right-handed users.

Figure 2:
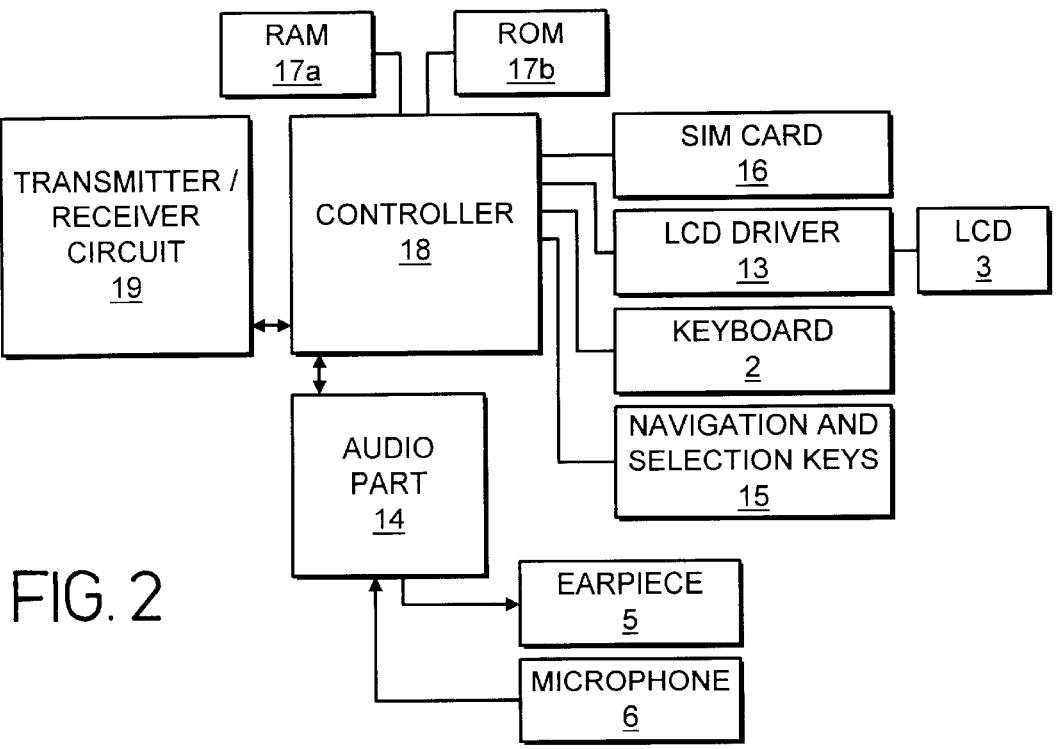
FIG. 2 schematically shows the essential parts of a phone for communication with a cellular or cordless network.

FIG. 2 schematically shows the most important parts of a preferred embodiment of the phone, said parts being essential to the understanding of the invention. The preferred embodiment of the phone of the invention is adapted for use in connection with the GSM network, but, of course, the invention may also be applied in connection with other phone networks, such as cellular networks and various forms of cordless phone systems or in dual band phones accessing sets of these systems/networks. The microphone 6 records the user's speech, and the analog signals formed thereby are A/D converted in an A/D converter (not shown) before the speech is encoded in an audio part 14. The encoded speech signal is transferred to the controller 18 (physical layer processor), which, i.a., supports the GSM terminal software. The controller 18 also forms the interface to the peripheral units of the apparatus, including RAM and ROM memories 17*a* and 17*b*, a SIM card 16, the display 3 via an LCD driver 13, the navigation and selection keys 15 of the phone 1 (FIG. 1), and the keypad 2 (as well as data, power supply, etc.). The controller 18 communicates with the transmitter/receiver circuit 19. The audio part 14 speech-decodes the signal, which is transferred from the controller 18 to the earpiece 5 via an D/A converter (not shown).

The controller 18 is connected to the user interface. Thus, it is the controller 18 which monitors the activity in the phone and controls the display 3 in response thereto.

Therefore, it is the controller 18 which detects the occurrence of a state change event and changes the state of the phone and thus the display text. A state change event may be caused by the user when he activates the keypad including the navigation key 10, and this type of events is called entry events or user events. However, also the network in communication with the phone may cause a state change event. This type of events and other events beyond the user's control are called non user events. Non user events comprise status change during call set-up, change in battery voltage, change in antenna conditions, message on reception of SMS, etc.

A phone according to the invention is provided with display means, e.g., the LCD display 3. A processor controls the display means in accordance with the operation of the navigation means and the selection means 10; 40, 41 (FIG. 8). The display means comprises a first display part 20 (FIG. 3) for displaying a string of entered information and a second display part 22 (FIG. 3) for displaying a string of a plurality of possible information candidates, one of these candidates being highlighted by the cursor 23 controlled by the navigation means 10; 40. The processor 18 copies the highlighted candidate from the candidate string into the entered information string upon selection by the selection means 10; 41.

Alphanumeric Entry Concept

The roller based alpha entry concept according to the invention is intended to supplement or succeed the alpha entry concept known per se which is based on multi-pressing of the numeric keys known from cellular phones such as Nokia 2110™. Preferably the user will be allowed to use a hybrid concept based on the two concepts.

If the user chooses to use the roller key, the selection of the characters is initiated for each character by using the roller. The user can—for each character—switch between each entry mode (for each character he can choose to use either the method known from Nokia 2110™ or the roller based method).

According to a preferred aspect the communication terminal according to the invention will be implemented as a cellular phone having display means formed as a graphical LCD display 3.

Figure 3:
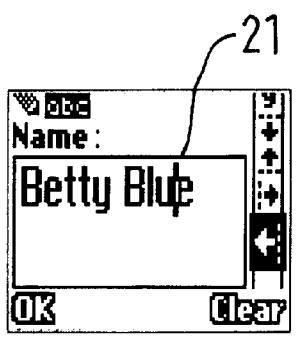
FIG. 3 shows a sequence of four displays illustrating a preferred embodiment of entering text into a phone according to the invention.

When the user indicates via the menu structure of the phone that he wants to input a name and a phone number in the phone book of the phone, he will be asked to input a name label in a display shown as the first display in FIG. 3. When the user accepts the name, he will be asked for a corresponding phone number. When the user accepts this one, too, the name and number will be stored accordingly.

As will be seen from the first display image in FIG. 3, the display 3 comprises a first display part 20 for displaying a string of entered information, e.g., a message or a name. The display 3 furthermore comprises a second display part 22 for displaying a string of a plurality of possible information candidates, one of these candidates being highlighted by the cursor 23 controlled by the navigation means—here the roller key 10. For this purpose, the roller key 10—acting both as navigation means for navigating though information candidates and as selection means for selecting one of the candidates—is equipped with an encoder means (not shown) detecting the rolling of the roller key 10.

The character list displayed in the second display part 22 contains "half"-characters at the top and at the bottom, partly to indicate that the list continues, partly to show as many characters as possible.

The first embodiment will be explained with reference to the English language, but a person skilled in the art will know that cellular phones are able to switch between a plurality of languages.

When the roller key 10 is rolled, the cursor 23 is moved through the information candidates listed in a list containing all allowable signs and characters and even some special functions. The roller key 10 acts as selection means, and for this purpose it is equipped with a microswitch (not shown) detecting when the depression exceeds a predetermined level. When the roller key 10 is depressed, the microswitch supplies a depression signal to the controller 18 that adds the character highlighted by the cursor 23 to the string of already entered information, of which at least a part is displayed in the first display part 20 at a position marked by a cursor 21 in this first display part 20.

Above the first display part 20 there is provided a headline which is a combined icon area including icons 24 and an operation mode indication area including a label 25, informing the user about the kind of text to be entered. The editor display looks slightly different depending on whether the user enters a short message (SMS; long text) or a name (short text) like in FIG. 3.

An area showing the present functionality 26 and 27 of the two soft keys 8 is provided below the first display part 20. The functionalities of the soft key 8 differ in dependence on the type of information to be entered. As will be seen from FIG. 3, the user has the functionalities "OK" and "Back" on the left soft key and on the right soft key, respectively, in name entry. "OK" will terminate the alpha entry. When the entry concept is used to enter an item into the phone book database of the phone, the phone will ask for a corresponding phone number when "OK" has been pressed. Pressing the "Back" soft key 8 will cause the phone to jump one level back in the menu structure, while pressing the "Clear" key 12 will cause the phone to go back to idle mode.

In message entry, the functionalities will be "Options" and "Back". "Option" will allow the user to select between "Send", "Erase", "Save", "Highlight", "Text cursor" and "Exit". "Send" will terminate the alpha entry and the phone will ask for a receiver for the message. "Erase" will clear the first display part 20 and the user may enter a new text. "Save" will store the text string and the user may use the stored text in a later transmission. "Exit" will cause the phone to go back to idle mode. By selecting the functionality "Text cursor" the user will be able to move the cursor 21 along the text string by using the roller key 10. Once the user selects a position in the text string, the roller key 10 again controls the movement of the cursor 23. The functionality of "Highlight" will be explained later on. However, despite these differences, the handling is basically the same for text entry.

In the second display image the user has entered the letter "B" by rolling and pressing the roller key 10. It should be noted that the cursor 23 displays the highlighted character inverted as seen from FIG. 3. At the same time a larger font size is used for the highlighted sign. In name entry, the so-called Title case is used. This is the reason for the automatic case switch which can be seen from the first to the second displays in FIG. 3. This means that succeeding characters will be inserted in lower case, which is also indicated in the icons 24 "ABC" and "abc".

In the third display of FIG. 3 a full name "Betty Blue" has been entered, and if further editing is required, this can be done by moving the cursor 23 to an appropriate arrow sign in the character string in the second display part 22. By pressing the roller key 10 once, the cursor 21 is moved one step backwards, as seen in the fourth display of FIG. 3.

The user can choose from different lists in the text entry mode. These lists are dependent on the currently selected language, but, according to the first embodiment of the invention, the basic lists include an upper case list used in an upper case mode, and a lower case list for use in a lower case mode. In the upper case mode, the user can choose from the following characters:

A B C D E F G H I J K L M N O P Q R S T U V W X Y Z Æ Ø Å ⌴ 0 1 2 3 4 5 6 7 8 9 . , –? ! ⇐ ⇒ ⇑ ⌴ AB and in the lower case mode, the user can choose from the following characters:

abcdefghijklmnopqrstuvwxyzæøå⌴0123456789 . , –? ! ⇐ ⇒ ⇑ ⌴ ab

The characters ÆØÅ/æøå are examples of language dependent characters. Also the "special characters" after the digits are language dependent. The "⌴" refers to a space character, and is present twice in the list. The arrow signs "⇐", "⇒", "⇑", and "" in the candidate lists refer to movements of the cursor 21 in the first display part 20. "AB" and "ab" will manually change the case for the letter to the left of the cursor 21 or for a highlighted string of letters in the first display part 20. In accordance with a first embodiment of the invention the cursor 23 will continue to highlight a selected character in the second display part 22 until the cursor has been moved by rolling the roller key 10. By multiple pressing one of the arrow signs, the cursor 21 in the first display part 20 moves a corresponding number of steps until the cursor meets a limit in the text string. Selecting the vertical arrows will cause the cursor 21 to move up and down in a linewise manner. Long pressing of the roller key 10 for selecting an arrow sign will cause fast moving of the cursor 21 as long as the roller key 10 is depressed.

When the list is displayed in the second display part 22, it is handled as an endless string repeating the list periodically.

A special character list will appear in the second display part 22 when the * key is present in the alphanumeric group of keys 7. This special character list may include all the special characters presently available in phones known per se, e.g., all Greek letters, mathematical operators, and currency signs. The special character mode is indicated in the icon area with the special character icon.

Pressing the "Clear" soft key 8 at any time will delete the character to the left of the cursor 21, if a character is present. The cursor 21 in the second display part 23 will not move upon deletion of a character.

When the operation "Highlight" available via the "Option" soft key 8 is selected, the user is asked to mark the beginning of the highlighted portion of the text. The cursor 21 in the second display part 23 will automatically jump to the first one of the four arrow signs. By pressing the roller key 10 an appropriate number of times with the desired arrow sign highlighted, the cursor 21 is moved to the right position. By pressing the left soft key 8, "Mark", the user indicates the beginning of the highlighted portion. The end of the highlighted portion is marked in the same manner. The right soft key 8, "Quit", allows the user to terminate the "Highlight" operation without affecting the entered text. Once the text part has been highlighted, the user is allowed to perform operations on the text part, such as copy to clipboard, delete, move, etc.

As will be seen from the above, digit and numbers may be entered via the character list by using the roller. It is obvious that a number may be entered by pressing the corresponding number key in the group of numeric keys 7. The number will be inserted in a position pointed out by the cursor 21.

Even though all characters can be entered by means of the roller key 10 and the character string in the second display part 23, it has been preferred to let the user use a hybrid concept based on this roller key 10 and the traditional alphanumeric keypad where the character of a key depends on the number of depressions of this key. A character is added to a text string after a certain period with no pressings, time-out, or after the activation of another key. Compared with Nokia 2110™ the special signs have been removed from the alphanumeric keys to the special sign string controlled by the roller key 10. Each key in the keypad 7 is therefore only associated with four signs on average.

When the user presses one of the keys "0–9", the cursor 23 will jump to the first number in the character string in the second display part 22. If the user presses the key, the corresponding number will be inserted at the position marked by the cursor 21 after a time-out corresponding to e.g., 0.8 sec. If the user releases the key, he can use the roller to select another digit character. The numeric keys may hereby be used for jumping in the character string.

When the user now long-presses, e.g., the "5/jkl" key, this will insert "5" immediately and show the cursor again. The user may continue to enter characters by using the roller key 10.

By multi-pressing a digit key, e.g., the "5/jkl" key, the second press (within the time-out) will bring up "J", and so on. The cursor 23 will remain in the digit area during the multi-pressing.

When the user has pressed the "5/jkl" key twice, a "J" will appear "pending" in the first display part 20. This mode is called "time-out-mode". It should be noted that the cursor 21 is not present within the time-out period. The right soft key 8 has now changed to the functionality "Clear". An activation of the "Clear" soft key 8 will immediately clear the character being entered (the "J").

After entering a character in the time-out mode the cursor 23 in the character list will not move back to the starting point ("a"). Pressing another alphanumeric key within the time-out period—including the special "*" key—will immediately insert the character and start the insertion of another character. Succeeding characters can be inserted in completely the same way, or using the roller method.

Basically, the entry method (the traditional one or the roller key based one) may be used on a "character basis". This means that the user can change entry method from character to character. The user can also change from the traditional method to the roller method for the same character.

Manual switching between upper case and lower case will be described in the following. As mentioned above, the editor concept is based on a so-called title case concept in name entry mode. When entering SMS messages and other longer texts, the phone will also switch automatically between upper case and lower case based on the so-called text case concept. These two concepts automatically linked to the mode of the phone will mean that manual upper case/lower case switching becomes less crucial.

However, the manual case change will be possible in two ways, by pressing the # key or by selecting the case switch icon "A/a" in the second display part 22. The manual upper case/lower case switching will not overrule the automatic case switching permanently—irrespective of the method. The case will be overruled for one character only. The case switch can be seen on the case/mode icon 24 in the headline, and on the case of characters in the second display part 22.

The title case concept and text case will be discussed briefly in the following. Characters that separate two sentences are called hard separators. These may comprise the following signs: ".", "!" and "?". Hard separators might be language dependent to a certain degree. Characters that separate two words are called soft separators. These may comprise the following signs: "␣", "–" and ":". Also soft separators might be language dependent to a certain degree.

The title case concept automatically selects the upper case for the first character of each word. That means after every soft separator and after every hard separator. The text case concept automatically selects the upper case for the first character of each sentence, i.e., after every hard separator.

As will appear from the above, the described editor concept contains several character modes. These are partly changed automatically (Title case handling, automatic return to normal alphabet after special character selection, etc.), and partly chosen manually (using manual upper/lower case switching, or by activating special characters on the 1 key and the * key).

Intelligent Alphanumeric Entry

A second embodiment according to the invention will be described in the following. The second embodiment of the invention provides a higher text entry rate. The basic idea is the same in the two embodiments, and it is only the list displayed in the second display part 22 that has been amended.

According to the invention the controller 18 looks on a previously entered character when such a one has been entered. The ROM memory 17b includes a number of prediction tables—one for each language. Due to the many languages available in the phone and the limited memory available in the phone, it is desired to reduce the required memory space for these prediction tables.

The simplest way of generating a prediction table is to analyze a dictionary for e.g. the English language. Every time an "a" occurs, the subsequent letter is registered. Finally the frequency of the subsequent letters is calculated and, e.g., the five–twelve most frequently occurring letters are selected and placed in alphabetical order in the prediction table for the most probable letter following an "a". This is done for all letters included in the language.

Alternatively, just the five letters are included in the probability list, and these could be listed in a ranked order with regard to probability. For the English language, this gives 130 characters in the prediction, and prediction tables for 20 languages based on Latin letters will take less than 3 kilobyte memory space.

Alternatively to a fixed number of suggested letters in the probability list, all letters occurring with a probability higher than, e.g., 5–10% could be included in the list. The size of the prediction table will not be affected substantially by this amendment.

Figure 4:
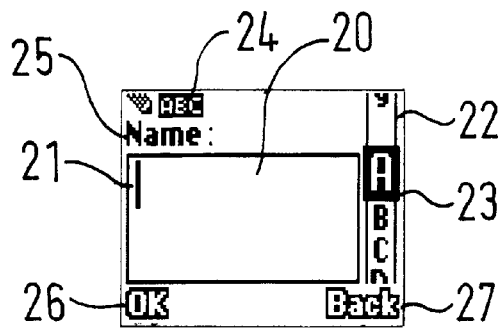
FIG. 4 shows a sequence of two displays illustrating a preferred embodiment of entering text in an intelligent way into a phone according to the invention.
Figure 4:
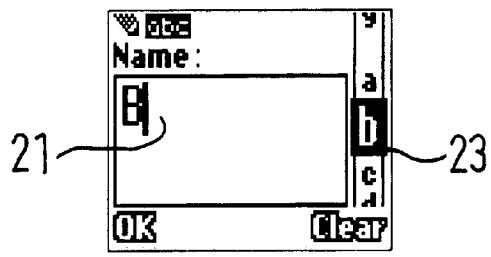
Figure 4:
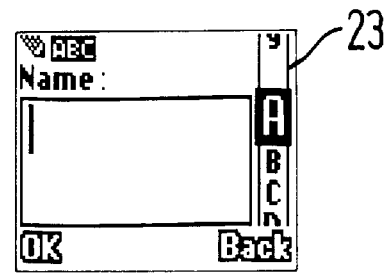
Figure 4:
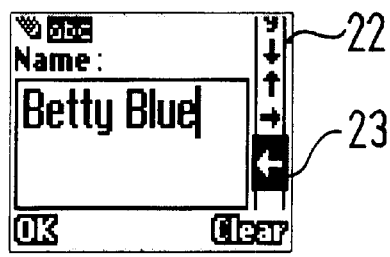
Figure 4:
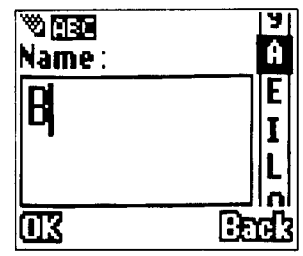

The first character in a word is difficult to predict, so here the user will simply be presented with the normal, complete alphabet, as was the situation according to the first embodiment, too. The cursor 23 highlights the letter "a", as shown in the first display in FIG. 4. When the second character in a word is to be entered, the phone starts suggesting suitable predicted characters in the character bar. Assuming that the user has typed a "B", the second display part 23 will now suggest the most probable characters that fit after the "B". In the example, these letters are "a, e, i, l, o, r, u, y". The list of the most probable characters will be sorted alphabetically according to the preferred embodiment. These characters may be called the probability list.

After the list of most probable characters, the remaining characters in the alphabet are shown. That means that the characters shown in the probability list are left out according to the preferred embodiment. These characters will, of course, be alphabetically ordered, too.

The character list displayed in the second display part 23 could hence look as follows when a "B" has been typed:

AEILORUY | BCDFGHJKMNPQSTVWX Z␣0123456789 . ,–? !⇐⇒⇑␣AB

The sign "|" illustrates the borderline between the probability list and the remaining part of the list. In the second display part 23 this could be illustrated by a horizontal dot line (not shown).

Alternatively, the full character string could be shown after the borderline in the second display part 23. This would create some redundancy—but only for the most probable characters. If the user misses a letter "r" in the probability list, the letter can be found in the remaining part of the list. The list may then look as follows.

AEILORUY | ABCDEFGHIJKLMNOPQRSTUVWXY ZÆØÅ␣ 0123456789 . , –? !⇐⇒⇑␣AB

The re-ordering of the character list may be done in many ways, and some of these will be discussed in the following.

When one or more characters are typed for a word, the prediction of probable characters can be performed. The prediction can be performed basically in three ways or a combination of these. The description above is based on only using the previous character for the prediction. Generally, vocals will have more characters in the probability list than consonants.

An example related to a set of prediction lists for the English language will be given with reference to table 1. The prediction list includes all letters in the English language and space signs. The list suggests a second letter following a first letter, and the list only includes letters having an occurrence probability higher than 5%.

Table 1 is based on a paper by R. William Sourekoff and I. Scott MacKenzie; "Theoretical upper and lower bounds on typing speed using a stylus and soft key-board"; Behaviour & Information Technology, (1995) 14(6), pp 370–379. In the paper the authors present a matrix-like table which shows the number of times a second letter succeeds a first letter in a standard text containing more than 100,000 letters. Spaces are included in the table since some letters appear very often at the end of the word, and a space is statistically an obvious possibility as the next letter when these letters appear in the word. Even though no correlation would be expected between a space and the first letter in the following word, some letters appear very often at the beginning of the word. However, this relation is clearly weaker than between two letters in a word, but the relation is stronger than the correlation between the overall appearance in the text and the appearance as an initial letter.

The first column in table 1 includes the 26 letters used in the English language and the space sign separating two words. Special signs, separators, and digits are left out of account with regard to the probability lists. When one of the letters in the first column appears in the first display part 20 prior to the cursor 21, the initial display will contain the corresponding probability list at the top of the second display part 22 with the cursor 23 highlighting the first letter in the probability list.

The letters in the probability list are ranked according to the probability of occurrence at the position in question. In the preferred embodiment only letters occurring with a probability higher than 5% are present in the list, and the number of letters in the list varies between one and nine, as appears from the third column. The average value, however, is just above 5.5 letters per list.

The fourth column shows how often the first letter occurs in a text, and the fifth column shows the efficiency of the probability list. In general, five out of six letters may be entered via the probability list, and only in one out of six must the letter be entered by scrolling through the remaining part of the candidate list. It is noted that it is hard to predict a letter following a space. It is furthermore noted that it is difficult to predict the letter following some of the vowels, e.g., "a", "e" and "o". However, the prediction of letters following a consonant is quite good.

| First letter. | Probability lists. | Number of letters in probability list. | First letter probability. | Percentage of letters covered by the probability list. |
|---|---|---|---|---|
| a | n; r; t; s; l; d. | 6 | 7.00% | 69% |
| b | e; u; o; a; l; r; i. | 7 | 1.40% | 92% |
| c | h; a; o; e; k; t; l. | 7 | 2.03% | 88% |
| d | "space"; e | 2 | 3.73% | 80% |
| e | "space"; r; n; d; a; s. | 6 | 11.47% | 78% |
| f | o; i; r; e; a; "space"; t; f. | 8 | 1.54% | 91% |
| g | "space"; e; h; o; r; i. | 6 | 1.88% | 84% |
| h | e; a; i; "space"; o | 5 | 6.65% | 94% |
| i | n; t; s; l; c; r; d; m; g | 9 | 4.45% | 84% |
| j | u; o; e; i. | 4 | 0.14% | 99% |
| k | e; "space"; i; n; s. | 5 | 0.92% | 97% |
| l | "space"; e; l; i; o; a; d; y. | 8 | 3.85% | 87% |
| m | e; "space"; a; o; i. | 5 | 2.13% | 85% |
| n | d; "space"; g; e; t; o. | 6 | 5.18% | 83% |
| o | u; n; m; t; w; o; "space". | 7 | 5.71% | 76% |
| p | e; l; o; a; "space"; r; i; u. | 8 | 1.32% | 85% |
| q | u. | 1 | 0.07% | 100% |
| r | "space"; e; o; s; i; a. | 6 | 5.06% | 79% |
| s | "space"; t; e; h. | 4 | 6.23% | 74% |
| t | h; "space"; e. | 3 | 8.44% | 78% |
| u | t; r; s; n; "space"; l; g. | 7 | 2.65% | 79% |
| v | e; i. | 2 | 0.85% | 92% |
| w | a; h; i; "space"; e; o. | 6 | 2.47% | 93% |
| x | t; p; "space"; a; i; c; e; u. | 8 | 0.12% | 99% |
| y | "space"; o; e. | 3 | 1.81% | 91% |
| z | e; z; l; a; s; y. | 6 | 0.05% | 89% |
| "space" | t; a; w; s; h; f; b. | 7 | 19.76% | 63% |

Table 1 shows an example of a probability list set for the English language.

Alternatively, the two previous or more characters may be used for the prediction. This increases the requirements for memory space, but gives an improved prediction for the user. The lists for the prediction concept based on a number of characters can be generated basically in the same way as for the prediction concept based on a single character. The lists will of course be physically larger, especially if the prediction is performed using more than two proceeding characters, but the idea is basically the same.

After "ph" (anywhere in a word) the probability list should probably only contain the letters: a, e, i and y. After "su" the list would perhaps include the letters: a, b, c, d, f, g, etc. After "sc" the list could contain: a, e, h, i, l, o, r, u and y.

An advantage of the prediction concept based on a number of characters is that the probability list will often contain all possible letters, so the user does not have to scroll to the remaining characters.

According to another alternative a complete dictionary could be used for the prediction. This will enable suggesting a complete 10–12 character word already after the typing of 2–5 characters! However, the user should have a possibility of scrolling through the words fitting the entered letters and this would require an improved display. It should be mentioned at the same time that it would require a substantial amount of space in the ROM memory 17b.

Calculator Input Using Roller

The basic entry concept is very useful for a calculator integrated in, e.g., a cellular phone. Here it will be straightforward to enter the digits by using the numeric keys 7 and to enter the desired mathematical operators via the second display part 23 and the roller key 10.

The second display part 23 may basically include the four basic mathematical operators, equal-sign for executing the entered calculation, decimal point, the memory functions known per se, percent sign, change of sign, and some currency conversion signs including the possibility of user-defined currency signs, e.g., updated via an SMS service. The candidate list could include the following candidates:

+−×÷=.M+M−MR MC% +/−$→£¥→£DM→£.

Figures 5, 6:
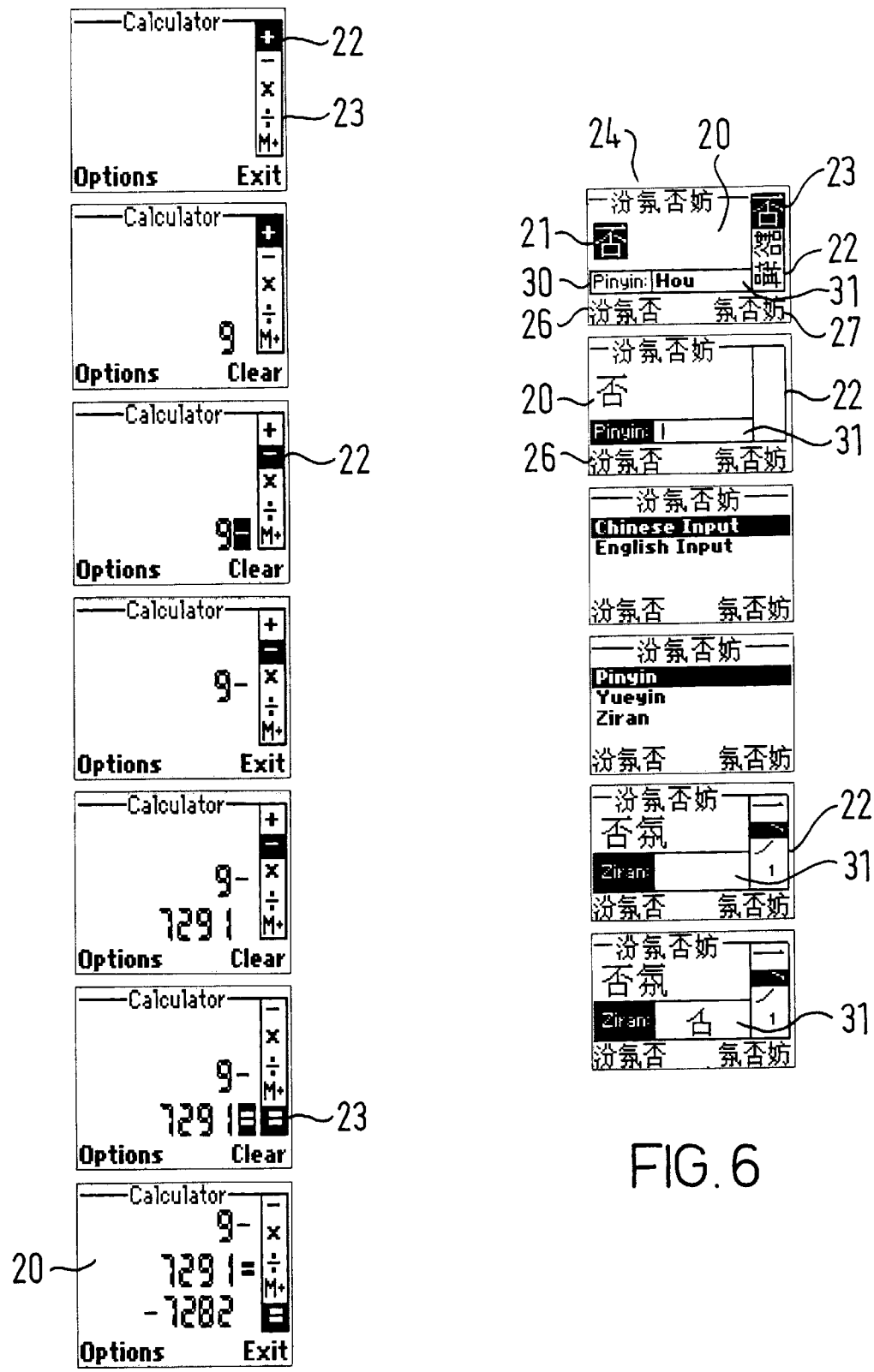
FIG. 5 shows a sequence of seven displays illustrating a preferred embodiment of entering digits and operators into a calendar integrated in a phone according to the invention.
FIG. 6 shows a sequence of displays illustrating a preferred embodiment of entering Chinese letters into a phone according to the invention.

The first display in FIG. 5 shows the initial display when the calculator is accessed from, e.g., the main menu of the phone. It will be seen that the two soft keys 7 have the functionality "Options" and "Exit". Pressing of "Exit" will cause the phone to leave the calculator mode and to go back to idle mode. "Options" will allow the user to define and update, e.g., currency conversion rates, but "Options" may also contain, e.g., "Copy", "Paste", and other more general functions.

In the initial calculator display the user can now press one or more numeric keys 7 to insert a digit or use the roller key 10 to point out a specific operator/function with the cursor 22 and select the specific operator/function by pressing the roller key 10.

If the user presses the numeric keys 7, the corresponding digits will be inserted—here the digit "9". When a numeric key has been pressed, the digits are not aligned totally to the right, because the extra space is used as an operator area. The right soft key 8, "Clear", will delete the digit entered last. Holding it will clear all digits after the first time-out (e.g., 0.8 sec), and will cause global exit from the calculator mode to idle mode after the second time-out (e.g., 1.6 sec).

It will be seen from the third display in FIG. 5 that the user has moved the cursor 22 by rolling the roller. Now the cursor highlights the "−" sign. Also the currently highlighted operator will be seen after the digits in the first display part 20. By pressing the roller key 10 for selecting a certain operator, the signs already entered will step one line up in the display, thereby preparing the bottom line for the next entry.

Now the right soft key 8 again has the functionality "Exit". The operator which has been entered may be deleted via the "Option" soft key 8.

The user may now again type digits, using the numeric keypad 7 to enter further digits. In the fifth display in FIG. 5 the user has entered the digits "7291", and in the next display the cursor 23 is moved to the equal-sign. Selecting the equal-sign will cause the entered digits and operators to jump one step upward, and the calculation to be executed, whereby the result will appear on the bottom line of the first display area 20, as will be seen in the seventh and last display of FIG. 5. The result cannot be edited, but the user can freely add operators to the result, e.g., to use the result in further calculations.

Pressing a numeric key 7, when rolling the roller key 10, will not select the operator; the digit will be inserted directly. Pressing the Clear soft key, when rolling operators, will first delete the temporary operator.

Pressing one of the standard or user-defined currency conversion signs, e.g., "$→£", "¥→£", or "DM→£", will convert the amount previously entered in one currency to a corresponding amount in the selected currency.

Text Entry Based on a Roller in Languages not Based on Latin Letters

Some languages are based on non Latin characters. However, Russian and Greek are closely related to Latin, and the text entry may therefore be handled in the same way.

Text entry in languages such as, e.g., Chinese, Japanese, Thai and Arabic is very difficult to handle via an alphanumeric keyboard, since the number of characters is very high compared with Latin. The list of character candidates will therefore appear to be endless, if means for reducing the amount of candidates is not provided.

It will be described in the following how characters in more exotic languages can be input using the roller key 10, and thus without any additional pressing of the alphanumeric keys 7. This aspect of the invention will be described with reference to Chinese. Due to the many characters in Chinese it is important to allow switching between several input methods.

The Most Important Chinese Input Methods are Listed Below

The Pinyin method is based on the pronunciation of Chinese characters. The Chinese phonetic system includes 6 basic vowels and 21 consonants. The leading consonants are called initials and other sounds finals. Vowels must be the main part of finals. Yueyin is mainly used in the Chinese mainland. The Zhuyin method contains 37 symbols representing vowels and consonants. The consonants are those phonetic codes which cannot be used alone. They must be combined with a vowel to form a character. Yueyin is mainly used in Taiwan. The Yueyin method is same as the Pinyin method, but it is designed for Cantonese speakers. Yueyin is mainly used in Hongkong.

The input methods for Chinese are well-known, and the most important ones of these are: Pinyin, Yueyin and Ziran. When the Chinese character entry has been chosen from the "Option" main menu item in the main menu of the phone, the user can switch between the input methods for Chinese by pressing the "#" key in the alphanumeric set of keys 7.

The first display in the sequence shown in FIG. 6 illustrates an example where the user has chosen text entry in Chinese via the Pinyin method. Above the first part of the display 20 some Chinese signs 24 illustrate the mode of the phone. The chosen text entry method is shown in a first special field 30 for non Latin related languages in the display. The present functionality of the soft keys 8 is indicated in the functionality fields 26 and 27 for the soft keys 8. During the text entry the user will be allowed to switch between the different text entry methods, including English.

In the first display in the sequence the user chose Pinyin as the input method. After that the user entered the Latin letters "hou" via the alphanumeric keys 7. The entered letters appear in a second special field 31 for non Latin related languages in the display.

The characters in non Latin related languages are stored in an electronic dictionary containing links to the corresponding pronunciations based on the Latin alphabet. Preferably, the searching in the pronunciation list is performed by means of fuzzy logic, whereby characters with a pronunciation matching the entered Latin letters are placed at the top of the candidate list displayed in the second display part 22, while candidates not matching so well are shown at the bottom of the list. Candidates not matching are left out of the list.

As will be seen from the first display, the highlighted character in the candidate list is the same as the one highlighted in the first display part 20. The user selects the right character highlighted by the cursor 23 by pressing the roller key 10. When this has been done, the second special field 31 is cleared and thereby the candidate list in the second display part 22, too. As will be seen from the second display, the character just selected is no longer highlighted in the first display part 20. The user can now start to enter the next Latin letters for the pronunciation of the next character or accept the entered text via the option menu item.

If the user wants to switch to another Chinese input method, he can do this without affecting the characters already entered. The user may perform the switching via the "Option" functionality available on the left soft key 8. In the "Option" list the user selects Chinese Input (third display) and in the fourth display the desired Chinese input method.

Alternatively, the user may press the "#" key in the second display to switch to Yueyin. Pressing the "#" key once more will cause the phone to switch to the Ziran input method.

In the Ziran input mode the candidate list in the second display part 22 will contain the available strokes, as seen in the fifth display in the sequence. The user now defines the characters by rolling and selecting the strokes from the roller list. The selected strokes are copied to the second special field 31 which, in the Ziran input mode, is used to construct a Chinese character, as seen in the sixth display. When the user wants to transfer the constructed Chinese character to the first display part 20, this can be done via the "Option" menu on the left soft key 8.

Text Entry Based on a Step Up/down Scroll Key and a Selection Key in Languages not Based on Latin Letters Until now the invention has been described with reference to a phone equipped with a roller key 10 acting as a combined navigation and selection means for the cursors in the display. However, the concept according to the invention, where a candidate list is showed in the display, and a cursor may be moved stepwise though the candidates, will also be very useful for phones having the navigation and selection functions divided into separate keys.

FIG. 8 shows an alternative embodiment for such a phone. The two soft keys 8 and the call handling keys 9 are integrated in a single soft key 40. The stepwise movement of the cursor is controlled by a scroll key 41. This concept is described in a pending patent application, GB 9624520.4, filed by the applicant, exposed at the Cebit fair at the end of February 1997 and used in the GSM phone, Nokia 3110, launched in June of the same year.

It will be seen from the first display in FIG. 7 that, when the user has entered the Chinese character entry mode based on the Pinyin method, both the first display part 20 and the second display part 22 of the initial display are empty. However, the cursor 21 in the first display part 20 indicates the position of the character entered next. The function "OK" (saves the entered characters) of the soft key 40 is displayed in a central soft key field 42.

When the letter "h" is entered by means of the alphanumeric keypad 7, the candidate list appears in the second display part 22 with one of the characters highlighted by the cursor 23. The highlighted character will be highlighted at the same time by the cursor 21 in the first display part 20. The user may navigate through the candidate list by pressing the scroll key 41 in an upward/downward direction. Instead, the user may enter further Latin letters to decrease the number of Chinese letters in the candidate list. When the desired character is highlighted, the user selects the character by pressing the soft key 40 with the functionality "Select". When this has been done, the second display part 22 is cleared and the cursor 21 is moved to indicate the position of the next character to be entered. This will be seen from the third display. The user may now start entering the next character by entering Latin letters, or he may accept the text as being complete by pressing the "OK" soft key 40.

Music Entry Based on a Roller

The concept for entering information into a communication terminal, such as a phone, is brilliant for entering music into the phone. This music may be used as ringing tones (alert signal), and the user is hereby allowed to personalize his phone by entering jingles created by the user himself or input on the basis of, e.g., a music book.

Basically, music may be defined as notes in a staff on a sheet of music. A clef, a time signature and, when necessary, a major define the tones (frequency) and the rhythm. A sub-menu loop may be accessed via a menu item "Tone settings" in the main menu loop of the phone. This tone menu setting may include a set of sub-menu items known from the phone called Nokia 3110 provided by the applicant. These items may include "call alert", "ringing volume", "ringing tone", "keypad tones", and "warning tones". The main menu item "Tone settings" may include a sub-menu item called "enter ringing tunes" according to the preferred embodiment of the invention. This sub-menu item will, e.g., allow the user to enter music via the user-operated User Interface. By selecting this sub-menu item the first image in FIG. 9 will appear in the display.

Above the first display part 20 there is provided a headline which is a combined icon area including icons 24 and operation mode indication area including a label 25, informing the user that music is to be entered.

FIG. 9 shows the first display part 20 for displaying a string of entered music in the form of notes placed in a staff including five lines. The second display part 22 includes a string of a plurality of possible information candidates. When starting the music entry, the candidates include clefs and majors at the top of the list. If the user disregards the characters, the music will be entered in C-major. When entering the individual notes, a staff segment 43 will appear in the second display part 22 aligned with the staff in the first display part 20. The position of the staff segment 43 will be fixed as long as notes are entered. Navigating with the roller key 10 will move a note 44 a full tone in the staff segment 43. The present position of the note will also be shown by the cursor 21. When the user selects a note by pressing the roller key 10, the cursor 21 will become a thin line cursor placed next to the note entered last. The position of the note 44 will be kept. When the roller key is pressed or rolled again, the note in question will be highlighted by the cursor 21.

The functionalities of the soft keys 8 are default "Options" and "Clear", as appears from the fields 26 and 27. "Clear" will clear the character to the left of the cursor 21. "Options" will allow the user to edit an already entered string of notes, e.g., by adjusting a note half a tone, or deleting and adding notes. Furthermore, the tempo of the music and the duration of one or more tones may be changed from standard settings. "Options" will also allow the user to save the entered music. "Options" may also allow the user to use more than one tone on a note. A buzzer is used for alerting. A tone is created by adjusting the duty cycle of the buzzer. The buzzer provides a multi-tone output when the duration of a tone is split into minor segments in turn having the duty cycles required for the individual tones.

The phone only allows the user to use a finite number of tones, e.g., between 14 (two octaves) and 21 (three octaves) depending on the frequency range of the buzzer. In addition to the clefs and the majors, the candidate list will include the staff segment with a number of note positions corresponding to the number of tones. Furthermore, the candidate list will include a number of operation signs, e.g., arrows, where the selection of one of these operation signs will move the cursor 21, e.g., one step backwards.

The cursors 21 and 23 have just been mentioned as cursors in the above description. However, it is obvious to a person skilled in the art that the meaning of the cursor 23 is just to identify a candidate. As will be seen from FIG. 9, this can be done by the position alone of the candidate string when the staff segment 43 is aligned with the staff in the first display part 20. However, when the cursor points out the operation signs or the clefs and the majors, the colour of the characters is inverted. In some applications the cursor 21 is a line cursor which just shows where a character will be entered, e.g., FIG. 3, and in other applications a rectangular cursor, e.g., FIG. 9, which shows the character to be entered.

The present invention includes any novel feature or combination of features disclosed herein either explicitly or any generalization thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of entering information into a communication terminal having a text editor application based for entering non-Latin letters, and having a display, a navigator for navigating through a list of information candidates, a selector for selecting one of the candidates, and a processor controlling the display in accordance with the operation of the navigator and the selector, the method comprising:

reserving a first display part of the display for displaying a first string of entered information;

reserving a second display part of the display for displaying a second string of a plurality of possible information candidates from said list of information candidates, and highlighting one of these candidates in the second display part by a cursor controlled by the navigation means;

reserving a third display part of the display for displaying complex information candidates to be entered in dependence on information candidates already entered; and wherein said processor is connected to a memory including a dictionary including signs in a language not based on Latin letters and corresponding pronunciation strings; the method further comprising the steps of searching pronunciation strings in the dictionary memory to find a string fitting with letters already entered; displaying a corresponding sign in the third display part; and copying the highlighted candidate from the candidate string into the entered information string upon selection by the selection means.

2. A communication terminal having a text editor application based for entering non-Latin letters, and comprising:

display means;

navigation means for navigating through information candidates;

selection means for selecting one of the candidates; and
a processor controlling the display means in accordance with the operation of the navigation means and the selection means;
in said text editor application:
   a first display part of the display means is reserved for displaying a string of entered information;
   a second display part of the display means is reserved for displaying a string of a plurality of possible information candidates, one of these candidates being highlighted by a cursor controlled by the navigation means;
   a third display part of the display means is reserved for displaying complex information candidates to be entered in dependence on information candidates already entered;
   said processor is connected to a memory including a dictionary including signs in a language not based on Latin letters and corresponding pronunciation strings; searches the pronunciation strings in the dictionary memory to find a string fitting with the letters already entered; displays the corresponding sign in the third display part; and copies the highlighted candidate from the candidate string into the entered information string upon selection by the selection means.

3. A communication terminal having a music composer application for entering music data information into the terminal, said terminal comprising:
   display means;
   navigation means for moving cursor means through a list of information candidates;
   selection means for selecting one of the candidates; and
   a processor controlling the display means in accordance with the operation of the navigation means and the selection means;
   in said music composer application:
      a first display part of the display means that is reserved for displaying a string of entered music data information into the music composer of the communication terminal;
      a second display part of the display means that is reserved for displaying a string of a plurality of possible music data information candidates; and
      cursor means for highlighting one of said string of a plurality of possible music data information candidates in said second display part;
      wherein the string of entered music data information is presented as a staff segment in the first display part;
      a staff segment will appear in the second display part when entering individual notes; and
      the staff segment in the second display part is aligned with the staff in the first display part.

4. A communication terminal according to claim 3, wherein the position of the staff segment in the second display part will be fixed during setting the height of the note by the navigation means.

5. A communication terminal having display means; navigation means for navigating through information candidates; selection means for selecting one of the candidates; and a processor controlling the display means in accordance with the operation of the navigation means and the selection means; said display means comprising:
   a first display part for displaying a string of entered information;
   second display part for displaying a string of a plurality of possible information candidates, one of these candidates being highlighted by a cursor controlled by the navigation means; and
   said processor copying the highlighted candidate from the candidate string into the entered information string upon selection by the selection means;
   wherein, in some applications, the display means comprises a third display part for displaying complex information candidates to be entered in dependence on information candidates already entered; and
   the processor is connected to a memory including a dictionary including signs in a language not based on Latin letters and corresponding pronunciation strings, searches the pronunciation strings in the dictionary memory to find a string fitting with the letters already entered, and displays the corresponding sign in the third display part.

6. A method of entering information into a communication terminal having a music composer, and having a display, a navigator for navigating through a list of information candidates, a selector for selecting one of the candidates, and a processor controlling the display in accordance with the operation of the navigator and the selector, the method comprising:
   reserving a first display part of the display for displaying a first string of entered music data information into a music composer of the communication terminal;
   reserving a second display part of the display for displaying a second string of a plurality of possible music data information candidates;
   highlighting by a cursor one of said second string of a plurality of possible music data information candidates in said second display part;
   presenting the string of entered music data information as a staff segment in the first display part;
   showing a staff segment in the second display part when entering individual notes; and
   wherein, in the showing step, the staff segment in the second display part is aligned with the staff segment in the first display part.

7. A method according to claim 6, wherein, in the showing step, the position of the staff segment in the second display part is fixed during a setting of the height of a note by the navigator.

8. A method of entering information into a communication terminal having a display; navigation means for navigating through information candidates; and selection means for selecting one of the candidates; said method comprising:
   displaying in the display a string of entered information;
   searching in a dictionary memory to find a word fitting with the letters already entered, and displaying the best fitting word in a third display part selectable by the user;
   searching in pronunciation strings for signs in a language not based on Latin letters in the dictionary memory to find a pronunciation string fitting with the letters already entered, and displaying a corresponding sign in the third display part;
   displaying, separately from the entered information string, a string of possible information candidates, one of these candidates being highlighted by a cursor controlled by the navigation means; and
   copying the highlighted candidate from the string of possible information candidates to the entered information string upon selection by the selection means.

* * * * *